United States Patent
Gontarz

(10) Patent No.: US 12,298,656 B2
(45) Date of Patent: May 13, 2025

(54) INTERACTIVE MULTIMEDIA DEVICE

(71) Applicant: PAN EXPRESS SP. Z O.O. SP. K., Warsaw (PL)

(72) Inventor: Grzegorz Gontarz, Warsaw (PL)

(73) Assignee: PAN EXPRESS SP. Z O.O. SP. K., Warsaw (PL)

( * ) Notice: Subject to any disclaimer, the term of this patent is extended or adjusted under 35 U.S.C. 154(b) by 374 days.

(21) Appl. No.: 17/910,439

(22) PCT Filed: Mar. 10, 2021

(86) PCT No.: PCT/IB2021/051992
§ 371 (c)(1),
(2) Date: Sep. 9, 2022

(87) PCT Pub. No.: WO2021/181301
PCT Pub. Date: Sep. 16, 2021

(65) Prior Publication Data
US 2023/0121040 A1    Apr. 20, 2023

(30) Foreign Application Priority Data
Mar. 10, 2020   (PL) .......................................... 129034

(51) Int. Cl.
| | |
|---|---|
| *G03B 21/16* | (2006.01) |
| *G03B 17/54* | (2021.01) |
| *G03B 21/14* | (2006.01) |
| *G03B 31/00* | (2021.01) |

(52) U.S. Cl.
CPC ............. *G03B 31/00* (2013.01); *G03B 17/54* (2013.01); *G03B 21/145* (2013.01); *G03B 21/16* (2013.01)

(58) Field of Classification Search
CPC .... G03B 21/16; G03B 21/145; H04N 9/3144; H04N 9/3141
See application file for complete search history.

(56) References Cited

U.S. PATENT DOCUMENTS

| | | | |
|---|---|---|---|
| 10,338,457 B2 | 7/2019 | Chiu et al. | |
| 2018/0084233 A1 | 3/2018 | Lara | |
| 2018/0364551 A1* | 12/2018 | Tanaka | ................. H04N 9/3144 |

FOREIGN PATENT DOCUMENTS

| | | |
|---|---|---|
| CN | 209514282 U | 10/2019 |
| EP | 1689172 A1 | 8/2006 |
| JP | 2019133092 A | 8/2019 |
| WO | 2004086137 A1 | 10/2004 |
| WO | 2010018594 A2 | 2/2010 |

* cited by examiner

*Primary Examiner* — Ryan D Howard
(74) *Attorney, Agent, or Firm* — Dickinson Wright PLLC; Andrew D. Dorisio

(57) ABSTRACT

An interactive multimedia device designed to display an image on a flat surface below the device, e.g., on the floor. The interactive multimedia device has a housing (10) which comprises a projector (11), at least one loudspeaker (12), a camera (13), an IR illuminator (15), a power supply module, and a control unit (16), wherein the housing (10) has vents (6) of housing (10), wherein the vents (6) of housing (10) have the same size and shape as those of the vents (17) of projector (11), wherein the vents (6) of housing (10) are oriented in the same way as the vents (17) of projector (11) and the vents (6) of housing (10) are located above the vents (17) of the projector (11).

13 Claims, 7 Drawing Sheets

INTERACTIVE MULTIMEDIA DEVICE

TECHNICAL FIELD

The subject matter of the invention is an interactive multimedia device designed to display an image on flat surfaces below the device, e.g., on the floor.

BACKGROUND

In solutions for interactive multimedia devices, projectors are generally placed under the ceiling while the other system components, such as loudspeakers, sensors, and control units, are mounted separately. The solution presented herein ensures a housing that contains the entire system, i.e., the projector, control unit, motion sensors and, preferably, loudspeakers.

U.S. Ser. No. 10/338,457B2 reveals a solution for a projector housing that comprises first and a second part of the housing. The two parts are combined to form an internal space.

EP1689172B1 reveals an interactive video display system in a housing that comprises a lamp, IR camera, computer, and projector.

SUMMARY

The subject matter of the invention is an interactive multimedia device that has a housing which comprises a projector, at least one loudspeaker, a camera, an IR illuminator, a power supply module, and a control unit. The housing comprises at least one housing vent. The at least one housing vent has the same size and shape as that of the at least one projector vent, wherein the at least one housing vent is oriented in the same way as the at least one projector vent, and the at least one housing vent is located above the at least one projector vent.

Preferably, the camera is mounted by means of a camera mounting, which camera mounting enables adjustment of the tilt of the camera.

Preferably, the camera and the projector lens are positioned in the same vertical plane of the device, and the mounting enables adjustment of the camera in that vertical plane of the device.

Preferably, the projector mounting allows the projector to be tilted so that the projector and the axis of the multimedia device form an angle of 13 degrees.

Preferably, the IR illuminator comprises at least two wide-angle power diodes emitting infrared light, which are controlled by a PWM signal from the control unit.

Preferably, the control unit comprises a microcontroller.

Preferably, the housing comprises a lower base, upper base, and side surface, which form the shape of a cuboid with rounded vertical edges. The lower base has a projection opening, and on the upper base there is the mounting. The lower base and the upper base have the shape of a rectangle with rounded edges.

Preferably, the lower base is composed of an inner screen, an inner layer, an outer layer, and an outer screen.

Preferably, the inner screen is made of stainless steel, the outer screen is made of low-carbon steel, while the inner layer and the outer layer are made of acrylic glass.

Preferably, the projection opening has the shape of a truncated circle, wherein the edge of the truncation is parallel to one of the edges of the lower base.

Preferably, the projection opening is located near one of the rounded corners.

Preferably, the mounting comprises a plate attached to the upper base, and there is a mounting hook movably attached to the plate.

Preferably, it comprises a handle preferably attached to the plate.

Preferably, in the lower base there is at least one group of sound openings.

BRIEF DESCRIPTION OF THE DRAWINGS

The invention has been presented in the drawings, where.

DETAILED DESCRIPTION

Figure 4:
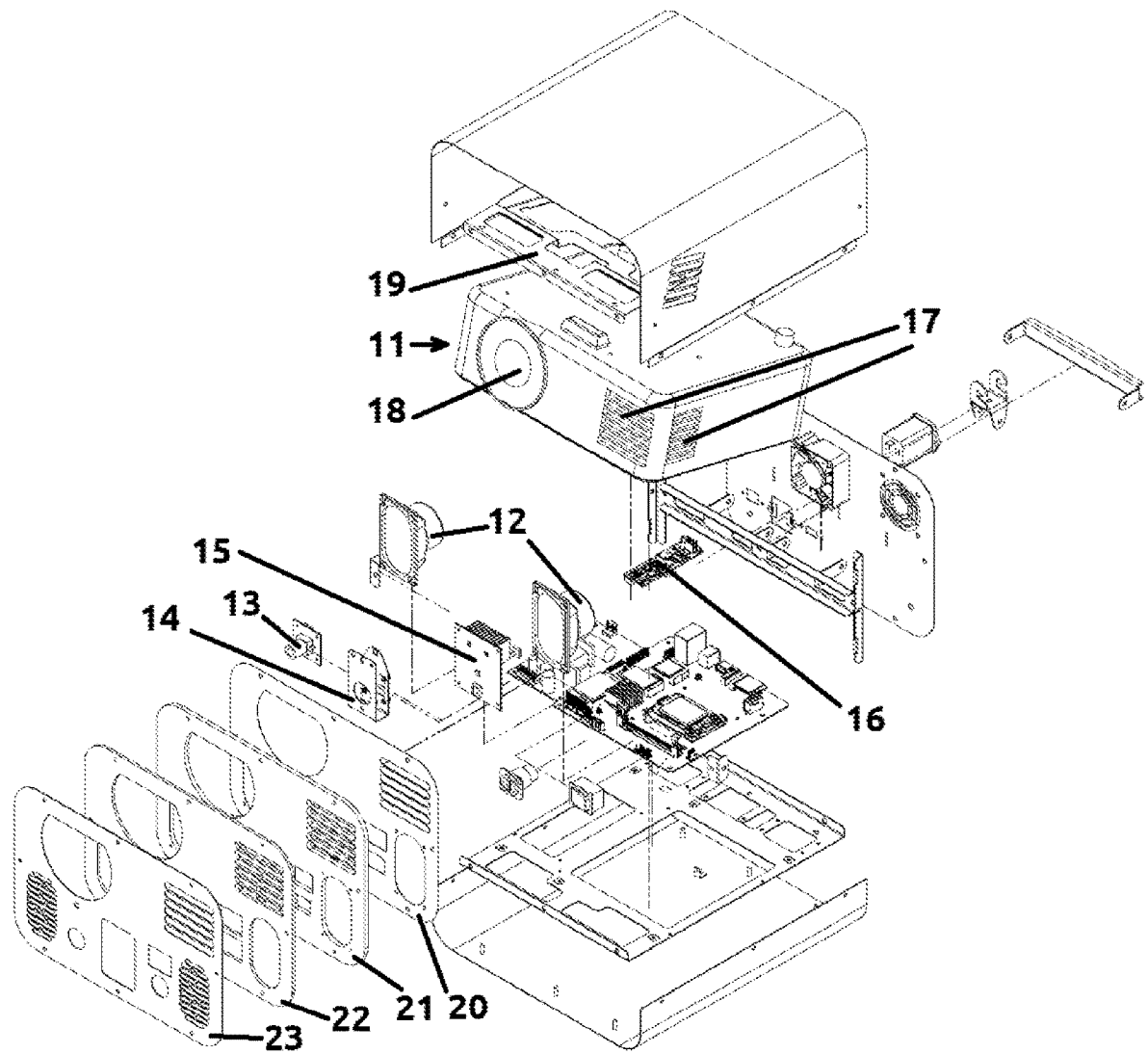
FIG. 4 shows an exploded view of the interactive multimedia device.

The invention has been presented in FIG. 4. The interactive multimedia device comprises a housing 10 which comprises a projector 11, at least one loudspeaker 12, a camera 13, an IR illuminator 15, a power supply module, and a control unit 16. In the embodiment, the brightness of the light is no less than 3,200 ANSI lumens, the throw ratio is less than 1, and the image resolution is at least 1280×800 (specifications of the BenQ MW632ST projector that has been used inside). The housing 10 comprises at least one vent 6 of housing 10. Additionally, the multimedia device has a built-in stereo sound system with a power of 2×15 W RMS based on high performance 5×9 wideband speakers and a dedicated audio power amplifier. Said at least one vent 6 of housing 10 has the same size and shape as that of the at least one vent 17 of projector 11, wherein the at least one vent 6 of housing 10 is oriented in the same way as the at least one vent 17 of projector 11, and the at least one vent 6 of housing 10 is located above the at least one vent 17 of projector 11. All this pairing of the vents 6 of housing 10 with the vents 17 of projector 11 (assuming that there is such at least one pair of the vent 6 of housing 10 and the vent 17 of projector 11) has allowed to obtain a compact size of the housing of the multimedia device and has minimized the need to use additional systems, cooling the inside of the housing, because the cooling system inside the projector, which is the main heat source of the multimedia device, can freely draw in cool air from outside the housing 10 of the multimedia device through the vents 6 of housing 10 (for example in the side wall on the left side, not visible in FIG. 4) and, at the same time, freely expel hot air out of the housing of the device through the vents 6 of projector 10 (for example in the side wall on the right side, as well as the vents in the front panel, as in FIG. 5).

In a preferable embodiment, the camera 13 is mounted by means of a mounting 14 of camera 13, which mounting 14 of camera 13 enables adjustment of the tilt of the camera 13. Even more preferably, the camera 13 and the lens 18 of projector 11 are positioned in the same vertical plane of the device, and the mounting 14 of camera 13 enables adjustment of the camera in that vertical plane of the device.

Thanks to that, it is possible to optically calibrate the device and to achieve a match between the projected image and the image recorded by the camera depending on the installation height of the device, fully eliminating the parallax error. When the camera 13 and the lens 18 of projector 11 are in the same vertical plane of the device (in the embodiment, this will be a plane perpendicular to the surface of the lower base 1 and of the upper base).

In yet another embodiment, the mounting 19 of projector 11 allows the projector 11 to be tilted so that the projector 11 and the axis of the multimedia device (in the embodiment a straight line perpendicular to the lower base 1 and the upper base 2) form an angle of 13 degrees. This solution makes it possible to eliminate the offset of the projector 11, and thus to obtain a projected image directly below the multimedia device.

In yet another embodiment, the IR illuminator 15 comprises at least two wide-angle power diodes emitting infrared light, which are controlled by a PWM signal from the control unit 16. Such an IR illuminator 15 may emit different illuminance of infrared light depending on the lighting conditions found at the installation site.

In another embodiment, the control unit 16 comprises a microcontroller. This unit allows to control the illuminance of the IR diodes with a PWM (Pulse-Width Modulation) signal, receive a signal from a remote control (using the signal received by IR receivers), switch on/switch off/restart the control unit, control the loudspeakers, and control a notification LED.

In a different embodiment, the lower base 1 comprises an inner screen 20, an inner layer 21, an outer layer 22, and an outer screen 23, wherein the screens 20, 23 and the layers 21, 22 are joined and together form the lower base 1. Preferably, the inner screen 20 is made of stainless steel, the outer screen 23 is made of low-carbon steel, while the inner layer 21 and the outer layer 22 are made of acrylic glass. In this variant, each element performs a different function. The inner screen 20, in the embodiment made of stainless steel, reduces the emissions of EMC electromagnetic radiation. The inner layer 21, for example made of acrylic glass, is an assembly base to which elements such as the loudspeakers 12, the camera 13, the IR illuminator 15, the switch in the switch socket 8, and the USB communications port 24, are attached. The outer layer 22, for example made of acrylic glass, is used to mask the IR receiver (in FIG. 3 as an IR illuminator shutter 25), the IR diodes, and the LEDs, without being a barrier to infrared light. The outer screen 23, for example made of low-carbon steel, masks the fixing screws of the USB port and of the loudspeakers.

Figure 1:
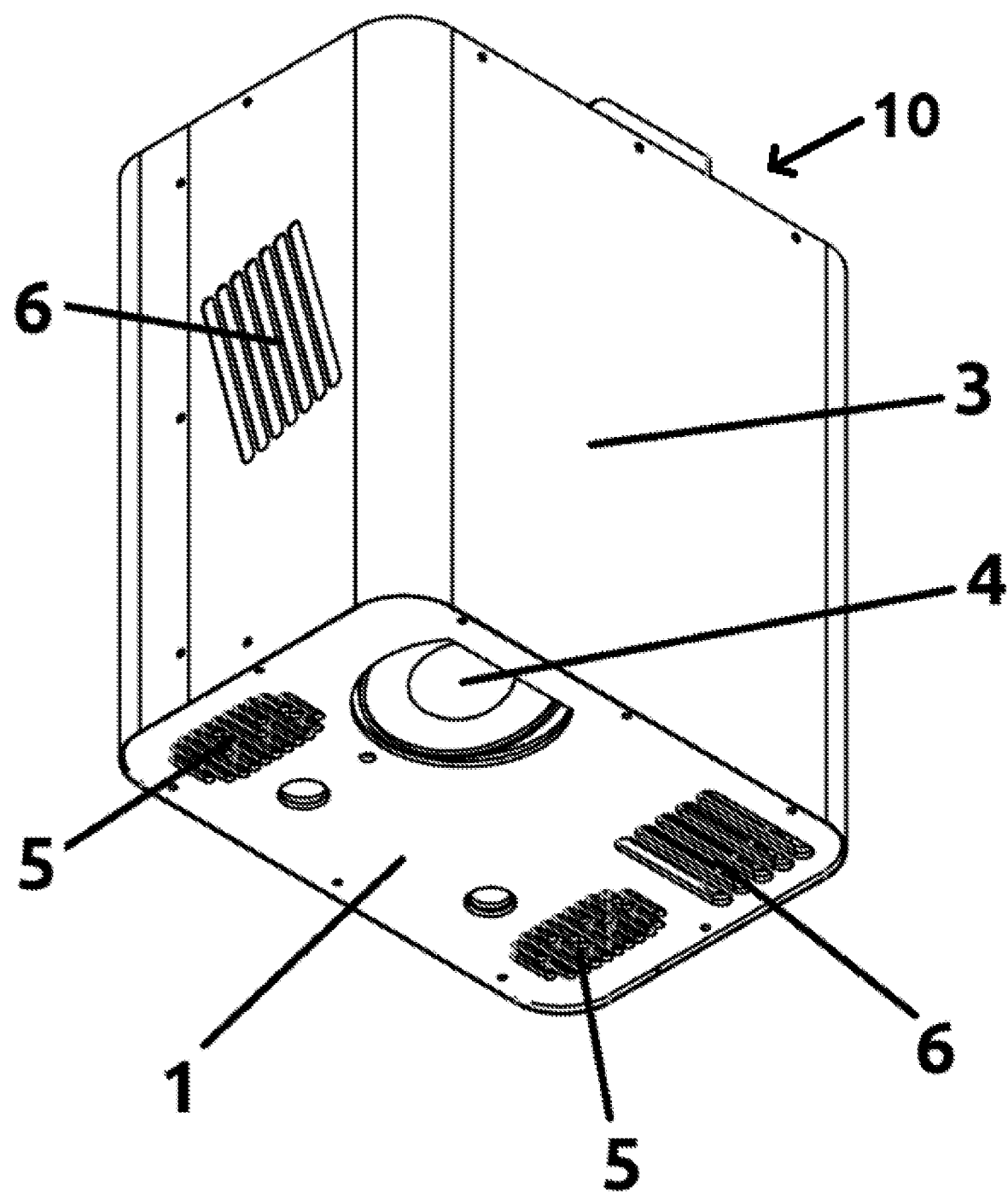
FIG. 1 shows the housing in an isometric view as seen from below.
Figure 2:
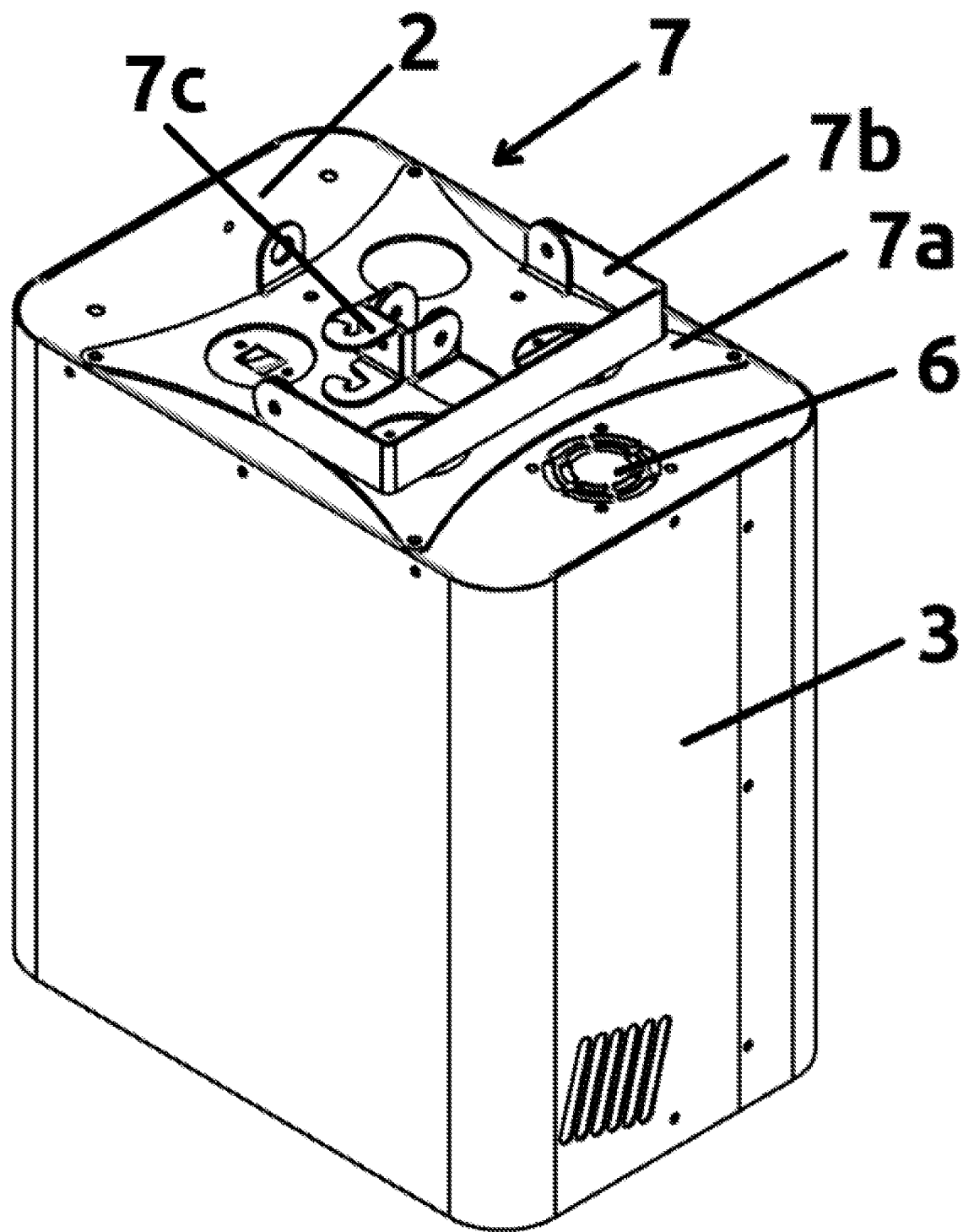
FIG. 2 shows the housing in an isometric view as seen from above.
Figure 3:
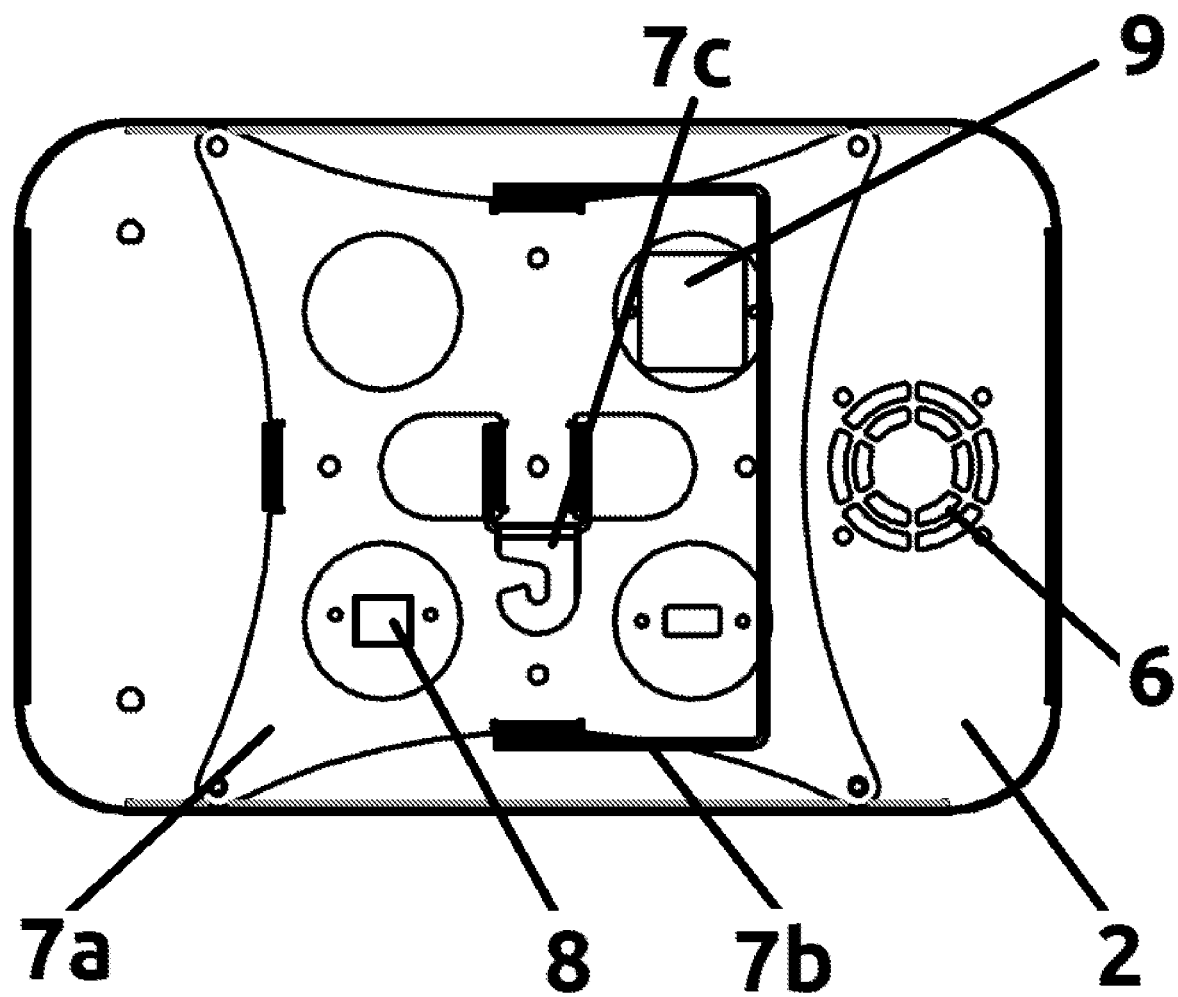
FIG. 3 shows a view of the upper base.

The housing of the solution has been presented in FIGS. 1-3. The housing comprises a lower base 1, upper base 2, and side surface 3, which form the shape of a cuboid with rounded vertical edges. On the lower base 1 there is a projection opening 4, through which the projector casts an image onto the surface below the device, e.g., the floor. On the upper base 2 there is a mounting 7, which allows the housing to be suspended from the ceiling. The lower base 1 and the upper base 2 have the shape of a rectangle with rounded edges. In the embodiment, the projection opening 4 has the shape of a truncated circle, wherein the edge of the truncation is parallel to one of the edges of the lower base 1.

In the embodiment, the projection opening 4 is located near one of the rounded corners. A significant number of projectors have the lens on the side of the housing, but this positioning of the projection opening 4 enables the size of the housing to be reduced.

In another embodiment, the mounting 7 comprises a plate 7a attached to the upper base 2, and there is a mounting hook 7c movably attached to the plate 7a and allowing to fix the device to the ceiling.

In yet another embodiment, the housing has a handle 7b preferably attached to the plate 7a. The handle 7b allows the device to be conveniently carried.

In another embodiment, in the lower base 1 there is at least one group of sound openings 5, which decrease attenuation of sounds from the inside of the housing, thus allowing to use internal loudspeakers.

In yet another embodiment, in the lower base 1 there is at least one group of vents 6 of housing 10, where said group of vents 6 of housing 10 facilitates the dissipation of heat from the projector. Such groups of vents 6 of housing 10 may also appear independently of each other in the upper base 2 or in the side surface 3.

In yet another embodiment, the group of vents 6 of housing 10 has a rectangular shape. Additionally, in another one, an extension of one of the edges of the rectangular shape of the group of vents 6 of housing 10 may intersect with the edge of either the lower base 1 or the upper base 2 at an angle between 60 and 90 degrees. These above-mentioned features allow the group of vents 6 of housing 10 to be adapted to the ventilation of the components used, which has a beneficial effect on the dissipation of heat from the inside of the housing.

In another embodiment, the upper base 2 has at least one switch opening 8 or at least one connector opening 9. This makes it possible to connect the devices contained in the housing to power supply and communications interfaces, as well as to manually switch the device on and off without having to disassemble the housing or pull out the power-supply cord.

Figure 5:
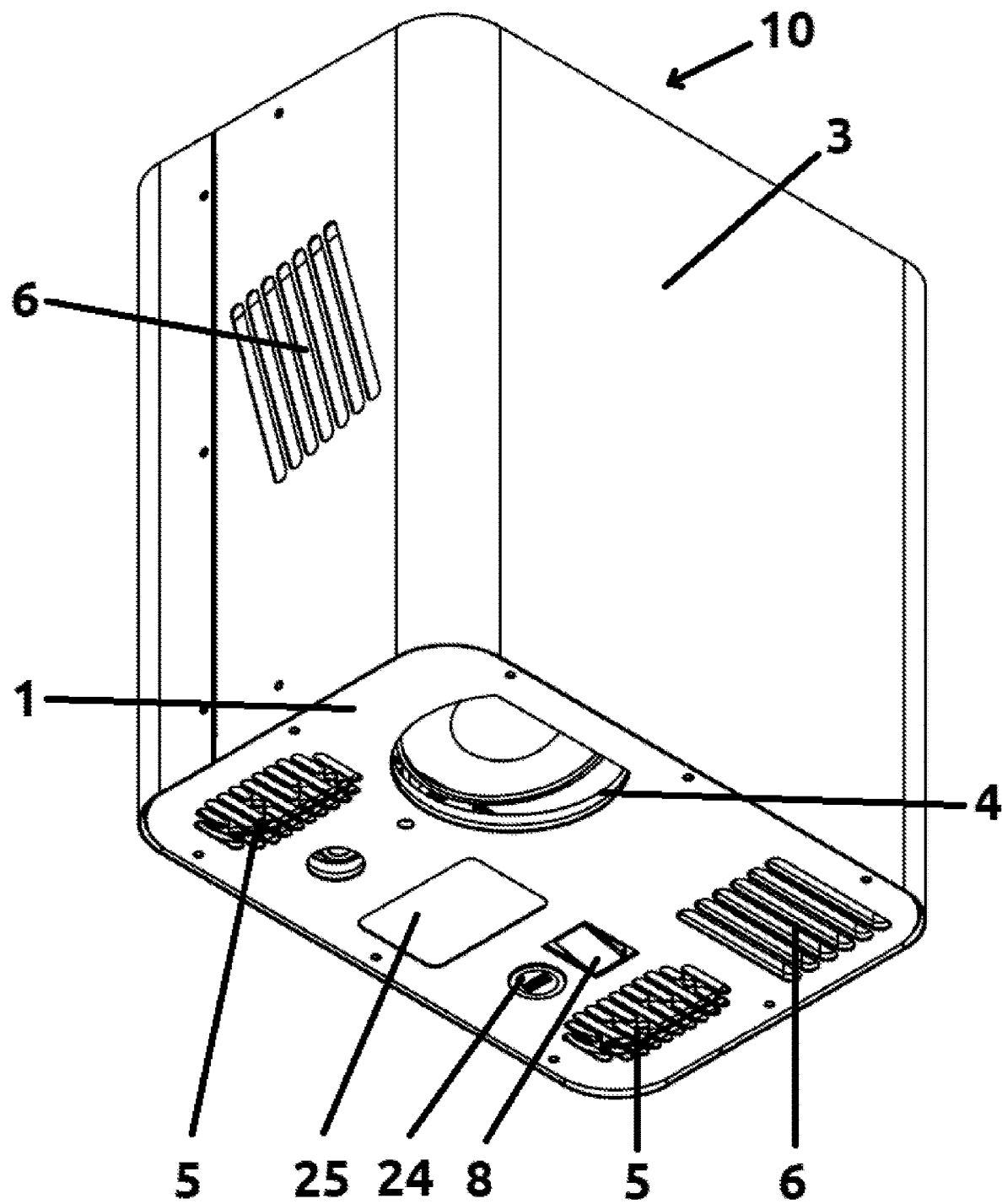
FIG. 5 shows the second embodiment of the housing in an isometric view as seen from below.
Figure 6:
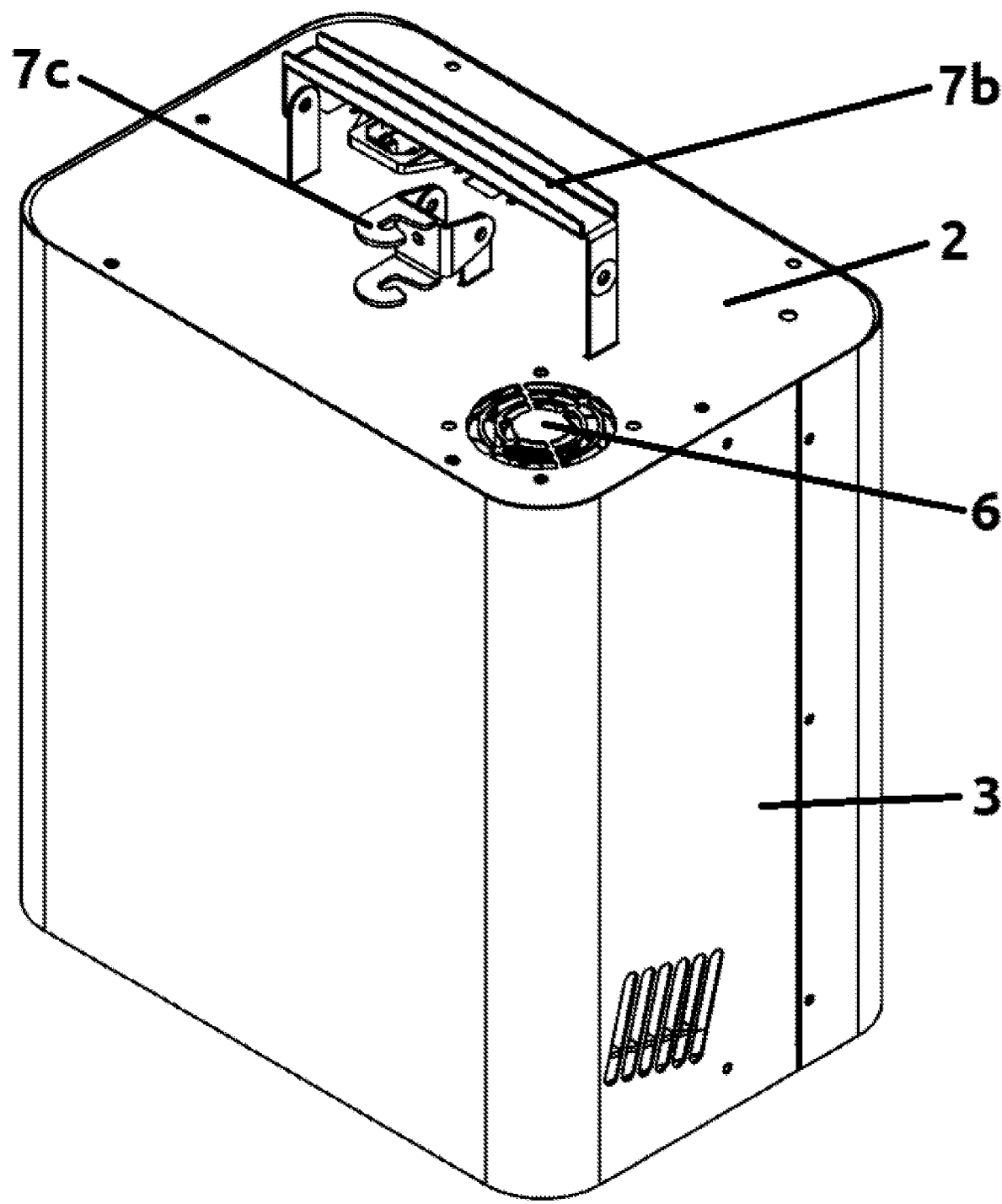
FIG. 6 shows the second embodiment of the housing in an isometric view as seen from above.
Figure 7:
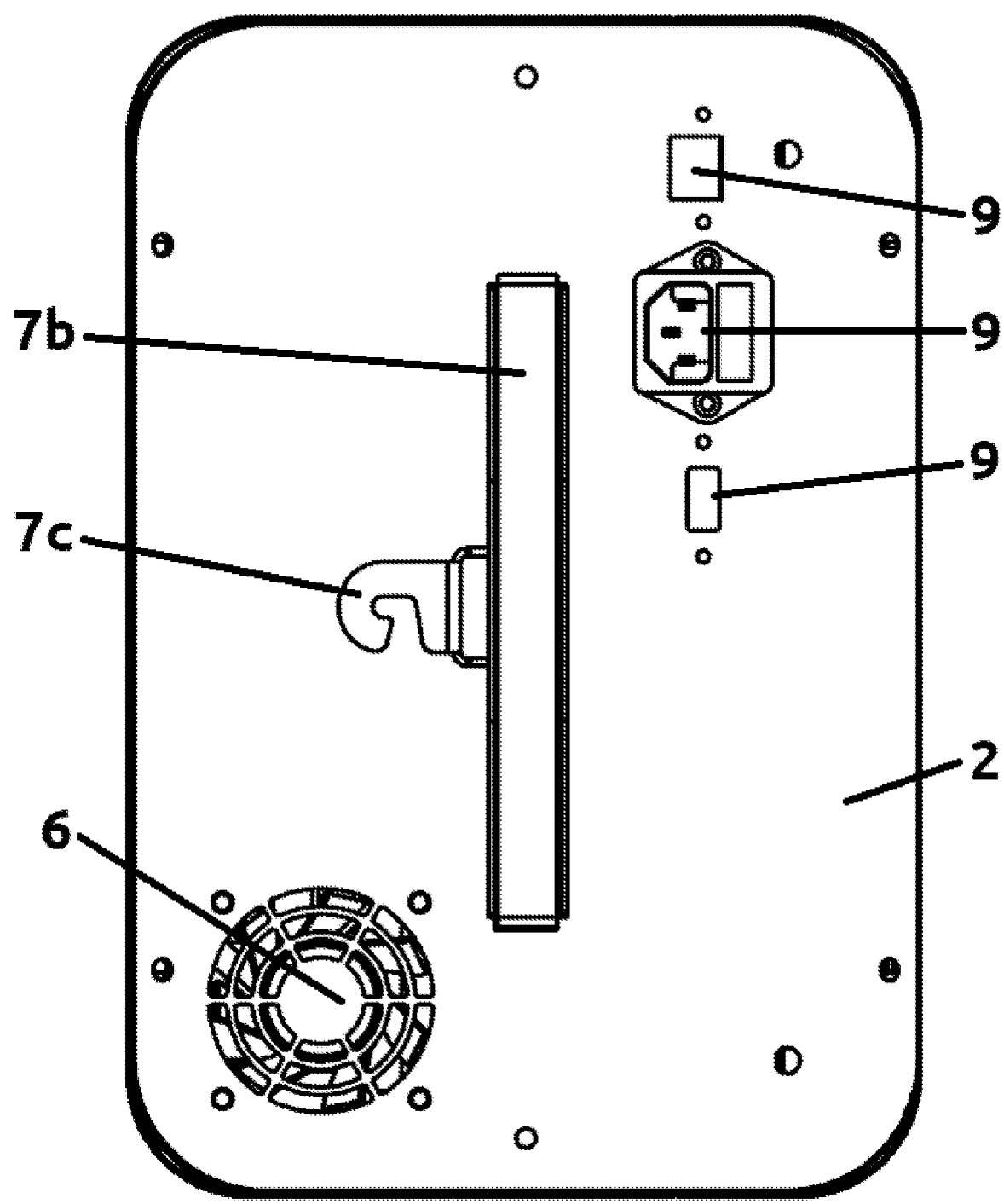
FIG. 7 shows a view of the upper base in the second embodiment of the housing.

The second embodiment of the housing has been presented in FIGS. 5-7. The housing in the second embodiment differs in the location of some elements, such as the locations of the switch and of the USB port (in the second embodiment, the switch opening 8 and the communications port 24 are located on the lower base 1). This change makes it easier for the user to operate the device suspended from the ceiling. In addition, a different execution of the mounting 7 has also been presented, where the plate 7a has not been used, and where the handle 7b and the mounting hook 7c are attached directly to the upper base 2.

The solution presented above makes it possible to obtain a compact multimedia device whose dimensions, in the embodiment, do not exceed 30 cm×20 cm×34 cm (W×D×H).

The device therefore has both a small volume, i.e., less than 0.0204 m$^3$, and a weight that, together with the handle, does not exceed 9 kg.

The motion sensor (based on the camera 13 and the IR illuminator 15) is active within a cone with a cone angle of minimum 70 degrees, with a high resolution capability across the full range of installation heights (from 2 to 5 m) of 3 cm from a distance of 4 m, thanks to the use of a camera 13 with a highly sensitive infrared light sensor and a wide-angle lens, combined with an IR illuminator 15 based on two wide-angle IR power diodes positioned in the vertical axis of symmetry of the lower base 1.

1—lower base
2—upper base
3—side surface
4—projection opening
5—group of sound openings
6—housing vents 7—mounting
7a—plate
7b—handle
7c—mounting hook
8—switch opening
9—connector opening
10—housing
11—projector
12—loudspeaker
13—camera
14—camera mounting
15—IR illuminator
16—control unit
17—projector vents
18—projector lens
19—projector mounting
20—inner screen
21—inner layer
22—outer layer
23—outer screen
24—communications port
25—IR illuminator shutter

The invention claimed is:

1. An interactive multimedia device that comprises:
a housing (10) which comprises a projector (11), wherein the housing (10) comprises at least one vent (6) of housing (10), wherein the at least one vent (6) of housing (10) has the same size and shape as that of an at least one vent (17) of projector (11), wherein the at least one vent (6) of housing (10) is oriented in the same way as the at least one vent (17) of projector (11) and the at least one vent (6) of housing (10) is located above the at least one vent (17) of projector (11),
at least one loudspeaker (12),
a camera (13), wherein the camera (13) is mounted by means of a mounting (14) of camera, which the mounting (14) of camera (13) enables adjustment of a tilt of the camera (13),
an IR illuminator (15),
a power supply module, and
a control unit (16).

2. The interactive multimedia device according to claim 1, wherein the camera (13) and the lens (18) of projector (11) are positioned in the same vertical plane of the device, and the mounting (14) enables adjustment of the camera in that vertical plane of the device.

3. The interactive multimedia device according to claim 1, wherein the mounting (19) of projector (11) allows the projector (11) to be tilted so that the projector (11) and the axis of the multimedia device form an angle of 13 degrees.

4. The interactive multimedia device according to claim 1, wherein the IR illuminator (15) comprises at least two wide-angle power diodes emitting infrared light, which are controlled by a PWM signal from the control unit (16).

5. The interactive multimedia device according to claim 1, wherein the control unit (16) comprises a microcontroller.

6. The interactive multimedia device according to claim 1, wherein the housing (10) comprises a lower base (1), upper base (2), and side surface (3), which form the shape of a cuboid with rounded vertical edges, wherein the lower base (1) has a projection opening (4) and on the upper base (2) there is the mounting (7), wherein the lower base (1) and the upper base (2) have the shape of a rectangle with rounded edges.

7. The interactive multimedia device according to claim 1, wherein the lower base (1) is composed of an inner screen (20), an inner layer (21), an outer layer (22), and an outer screen (23).

8. The interactive multimedia device according to claim 1, wherein the inner screen (20) is made of stainless steel, the outer screen (23) is made of low-carbon steel, while the inner layer (21) and the outer layer (22) are made of acrylic glass.

9. The interactive multimedia device according to claim 1, wherein the projection opening (4) has the shape of a truncated circle, wherein the edge of the truncation is parallel to one of the edges of the lower base (1).

10. The interactive multimedia device according to claim 1, wherein the projection opening (4) is located near one of the rounded corners.

11. The interactive multimedia device according to claim 1, wherein the mounting (7) comprises a plate (7a) attached to the upper base (2), and there is a mounting hook (7c) movably attached to the plate (7a).

12. The interactive multimedia device according to claim 1, wherein it comprises a handle (7b) preferably attached to the plate (7a).

13. The interactive multimedia device according to claim 1, wherein in the lower base (1) there is at least one group of sound openings (5).

* * * * *